United States Patent
DiMambro

(10) Patent No.: US 7,187,676 B2
(45) Date of Patent: Mar. 6, 2007

(54) APPARATUS AND METHOD FOR STEERING A COMMUNICATION TO AN OPEN STREAM

(75) Inventor: Francesco R. DiMambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1086 days.

(21) Appl. No.: 10/163,043

(22) Filed: Jun. 4, 2002

(65) Prior Publication Data

US 2003/0223456 A1 Dec. 4, 2003

(51) Int. Cl.
*H04L 12/28* (2006.01)

(52) U.S. Cl. .................. 370/392; 370/400; 370/469

(58) Field of Classification Search .................. None
See application file for complete search history.

(56) References Cited

U.S. PATENT DOCUMENTS

| | | | | |
|---|---|---|---|---|
| 5,245,608 A | * | 9/1993 | Deaton et al. | 370/469 |
| 5,530,703 A | * | 6/1996 | Liu et al. | 370/255 |
| 6,038,609 A | * | 3/2000 | Geulen | 709/250 |
| 6,771,646 B1 | * | 8/2004 | Sarkissian et al. | 370/392 |
| 6,775,284 B1 | * | 8/2004 | Calvignac et al. | 370/392 |
| 2004/0228339 A1 | * | 11/2004 | Gallo et al. | 370/379 |

* cited by examiner

*Primary Examiner*—Chau Nguyen
*Assistant Examiner*—Jung Park
(74) *Attorney, Agent, or Firm*—Park, Vaughan & Fleming LLP

(57) ABSTRACT

An apparatus and method for expeditiously steering a received communication (e.g., packet, cell, frame) to one or more communication streams. When a new communication stream is opened on a network interface circuit or other Primary Point of Attachment (PPA), the protocol to which the stream is bound is used as a Service Access Point (SAP). A hierarchy of SAP nodes (e.g., a binary tree) is constructed, with each node corresponding to a unique SAP. Each node includes its corresponding SAP value, a count of the number of communication streams bound to the associated protocol, and a reference to those streams. When a communication is received, its SAP is extracted and the hierarchy is searched for a matching node. The communication is then forwarded to each referenced stream.

20 Claims, 3 Drawing Sheets

APPARATUS AND METHOD FOR STEERING A COMMUNICATION TO AN OPEN STREAM

BACKGROUND

This invention relates to the field of computer systems. More particularly, an apparatus and method are provided for steering a received communication to one or more communication streams.

Traditionally, when a communication stream is opened on a communication interface (e.g., a Network Interface Card or NIC) of a host computing device, the stream is bound to a particular protocol. That protocol may act as a Service Access Point (SAP) for the stream. Each time a new stream is opened and associated with a SAP, an entry is added to a linked list of such associations.

When a packet, cell or other communication is received at the communication interface, the linked list is searched to individually identify each stream associated with the SAP of the communication. This requires every list entry to be visited at least once. Each entry is checked to determine if it corresponds to a communication stream that is on the same interface and associated with the same SAP as the new communication.

Naturally, the list would grow as more communication streams are opened on the host, thereby increasing the amount of time needed to search the list and forward the communication to each associated stream. Because the number of streams associated with a SAP could not be known until the entire linked list is searched, a device driver for the communication interface, or an upper layer protocol may make an unnecessary copy or duplicate of the packet, thereby decreasing efficiency.

In some computing devices, special allowance was made for a selected SAP (e.g., one that corresponds to a protocol reflected in more communications than any other protocol). In particular, in the soft state data structure for a communication interface, an entry would be made to identify a communication stream associated with the selected SAP. When a packet was received with that SAP, the linked list of streams could be ignored, and the associated communication stream could be identified by checking the soft state data structure. However, if there was more than one communication stream associated with the selected SAP, then this special treatment could not be applied.

SUMMARY

In one embodiment of the invention, an apparatus and method are provided for steering a communication to one or more communication streams associated with the same SAP as the communication. A SAP may correspond to a communication protocol, ethertype or other field or parameter of a communication. In this embodiment, associations between communication streams and SAPs are recorded in a hierarchical manner (e.g., in a binary tree). The hierarchy may be rooted in the soft state data structure of a communication interface (e.g., a Network Interface Card or NIC) that receives communications for a host computing device.

In one embodiment, each node of the hierarchy corresponds to a unique SAP and identifies all communication stream(s) associated with that SAP. A node may, for example, reference a linked list of data structures representing the streams. Each node may also include a count of the number of communication streams associated with the SAP. Thus, identifying the streams associated with the SAP of a newly received communication is performed quickly, by locating the node for the SAP without having to search the entire hierarchy.

DETAILED DESCRIPTION

Figure 1:
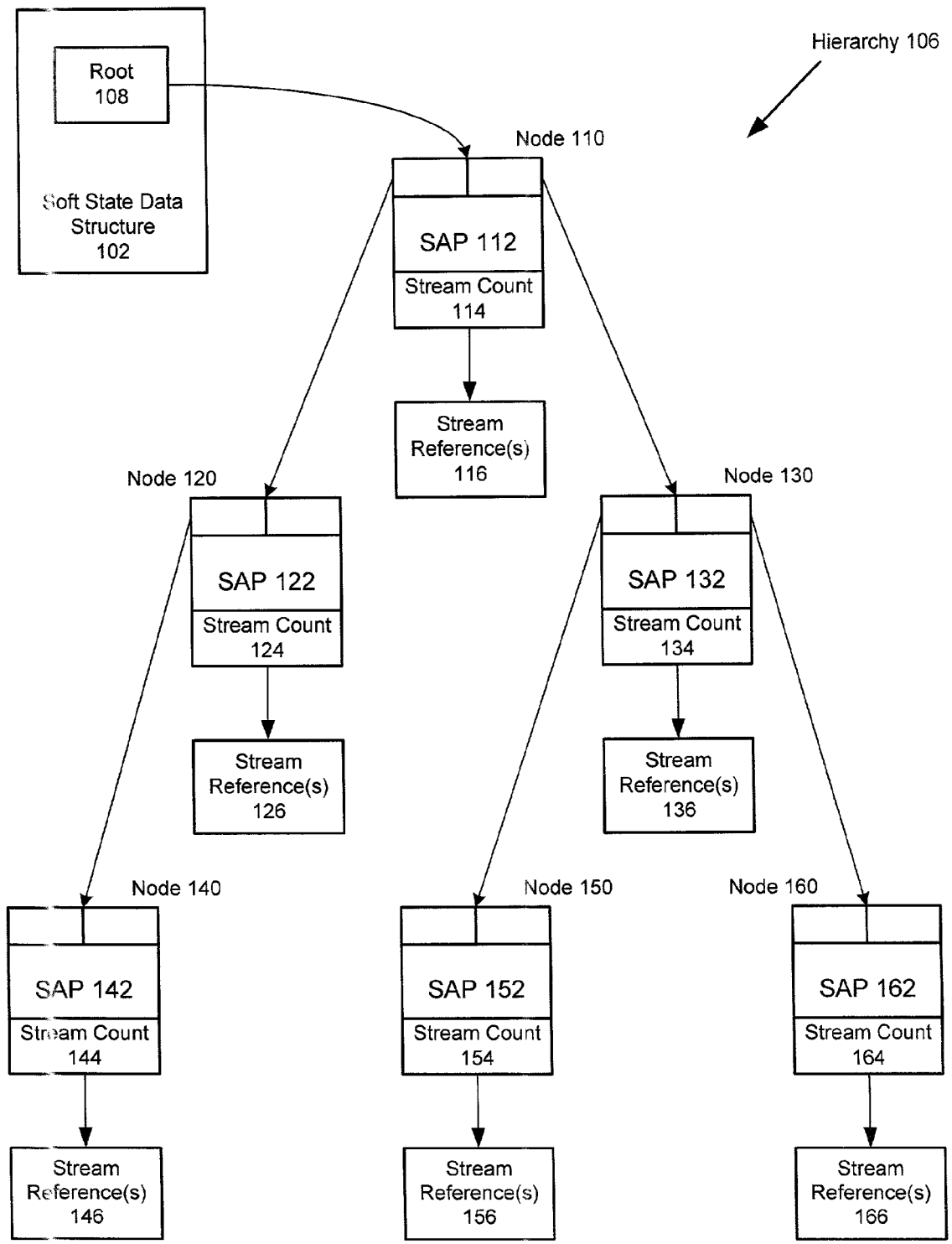
FIG. 1 is a block diagram depicting a hierarchy of SAP (Service Access Point) nodes for identifying a communication stream bound to a particular SAP, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computing device or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile memory (e.g., ROM, disk), carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, an apparatus and method are provided for using a hierarchical structure to facilitate identification of a communication stream associated with a particular SAP (Service Access Point). In this embodiment, a SAP may correspond to a particular protocol, ethertype or other data or information that may be used to determine how to process or handle a communication. For example, in a packet-switched network, a SAP may comprise all or a portion of the type/length field of an Ethernet packet.

Illustratively, the hierarchy may be implemented as a binary tree or some other form of tree. Each node in the SAP hierarchy may be considered a SAP node. The hierarchical structure is assembled as communication streams are opened and configured, and is searched when a communication is received (e.g., packet, frame, cell) is received and a SAP is retrieved from the communication. Each node includes the value of its corresponding SAP, identifies (e.g., in a list, with pointers) the communication streams associated with the node's SAP, and may also include a count of the number of such communication streams.

In this embodiment, a separate hierarchy of SAP nodes may be implemented for each communication interface (e.g., Network Interface Card or NIC) or Primary Point of Attachment (PPA) of a host computing device. In other embodiments, a hierarchy may pertain to all interfaces or PPAs having a common device driver.

When a communication stream is opened and attached to a communication interface, a data structure for storing information regarding that stream is created. The stream is bound to a selected protocol or application, which is associated with a particular SAP. Multiple communication streams may be bound to a particular protocol and associated with the same SAP. When a communication is received with that SAP, it should be forwarded to each associated stream.

The SAP node corresponding to a particular SAP may reference the communication stream's data structure in order to identify that stream and indicate its association with the SAP. Illustratively, the reference to the stream may be stored in the SAP node hierarchy when the stream is bound to the selected protocol.

A hierarchy of SAP nodes for a particular communication interface may be initialized when a first communication stream is attached to the interface. The hierarchy is then expanded when a new SAP is associated with a communication stream. The hierarchy may be pruned when the last communication stream associated with a particular SAP is closed. The hierarchy may or may not be balanced or otherwise optimized for searches or for storage.

FIG. 1 depicts an illustrative hierarchy of SAP nodes according to one embodiment of the invention. In this embodiment, hierarchy 106 comprises a binary tree rooted in soft state data structure 102 of a particular communication interface or other PPA (Primary Point of Attachment). Soft state data structure 102 is configured to store various status information and/or other data concerning the communication interface.

Root 108 identifies or references node 110, which comprises a first SAP value (SAP 112) and a count 114 of the number of streams associated with the first SAP. Node 110 also identifies (e.g., in a list or other structure) the specific communication streams bound to the protocol corresponding to SAP 112. Thus stream references 116 may comprise references to, or a list or other collection of, the streams' data structures.

Each node in hierarchy 106 is configured with two pointers to reference child nodes. For example, node 110 includes a first pointer to node 120 and a second pointer to node 130, each of which corresponds to a different SAP value (e.g., SAP 122 and SAP 132). One or both child pointers of a node may be null pointers.

A SAP node hierarchy may include virtually any number of nodes. The hierarchy facilitates rapid search through its logical structure. For example, if implemented as a standard binary tree, the first (e.g., left) pointer of each node identifies a node having a lower SAP value, while the second (e.g., right) pointer references a node corresponding to a higher SAP value. By comparing the SAP of a newly received communication to the SAP value of a particular node, it can be quickly determined which portion of the hierarchy to traverse.

Hierarchy 106 may be periodically or regularly balanced or optimized, or may be allowed to evolve without being balanced. A new node is added when a new communication stream is bound to a protocol associated with a SAP not already reflected in the hierarchy. A SAP node may be removed when the last stream in its set of stream references is closed; or, the node may be left in the hierarchy so that it need not be re-created when another stream is associated with the corresponding SAP.

In one embodiment of the invention, a SAP node hierarchy is assembled and managed by the device driver of the communication interface for which the hierarchy is used.

Figure 2:
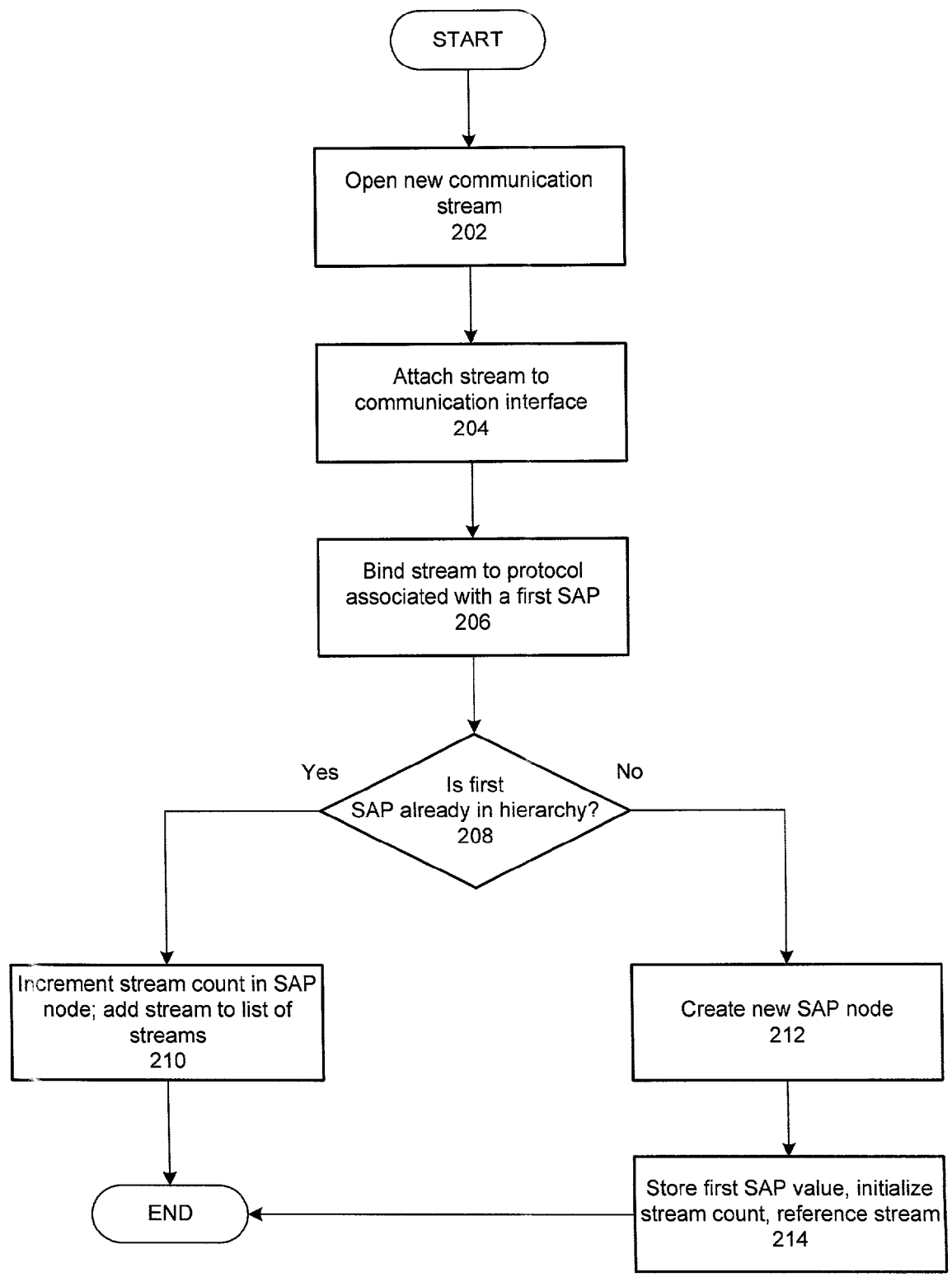
FIG. 2 is a flowchart illustrating one method of configuring a hierarchy of SAP nodes, in accordance with an embodiment of the invention.

FIG. 2 demonstrates a method of populating or assembling a hierarchy of SAP nodes, according to one embodiment of the invention.

In operation 202, a new communication stream is opened on a host computing device comprising one or more communication interfaces or PPAs, such as network interface cards. The host device may be a desktop computer, a server, a portable computer (e.g., a laptop or handheld) or other intelligent device capable of receiving communications (e.g., packets, cells) through a wired or wireless link.

In operation 204, the stream is attached to a communication interface. If this is the first stream attached to the interface, then a soft state data structure for storing information regarding the interface may be created. A root for a SAP node hierarchy may be configured in the structure when the structure is created or when a first SAP node is added.

In operation 206, the stream is bound to a layer three communication protocol (e.g., IP, Address Resolution Protocol (ARP), Appletalk). The selected protocol is identifiable by, or otherwise associated with, a unique SAP. For example, the SAP may identify a specific field or parameter that is stored in every communication configured according to the protocol.

In an embodiment of the invention in which an ethertype identifier is used as a SAP, illustrative SAP values include (expressed in hexadecimal notation): 0800 (IP—Internet Protocol), 0805 (X.25 Level 3), 0806 (ARP—Address Resolution Protocol), 8035 (Reverse ARP), etc.

In another embodiment of the invention, SAP nodes in a hierarchy may correspond to SAPs used in 802-compliant protocol stacks, such as (in hexadecimal notation): 00 (null SAP), 02 (Logical Link Control sublayer management function), 06 (IP), 98 (ARP), AA (SNAP—Subnetwork Access Protocol), etc.

In operation 208, a device driver for the communication interface searches the SAP node hierarchy, if it already exists, for a node corresponding to (and storing) the SAP value. If the SAP is not yet reflected in the hierarchy, or the hierarchy has not yet been created, the illustrated method advances to operation 212.

Otherwise, in operation 210, the stream count within the node corresponding to the SAP is incremented and the node is modified to identify the new communication stream. For example, a linked list of references to streams may be modified to include the new stream. After operation 210, the method ends.

In operation 212, a new SAP node in created in the hierarchy. If the new node is the first node, the root (in the soft state data structure for the communication interface) is pointed to the new node. Otherwise, the new node is inserted in an appropriate location. The hierarchy may be balanced as part of the insertion process.

In operation 214, the new node is configured to store the SAP value, set the stream count (e.g., to one) and to identify or reference the new communication stream. The method then ends.

Figure 3:
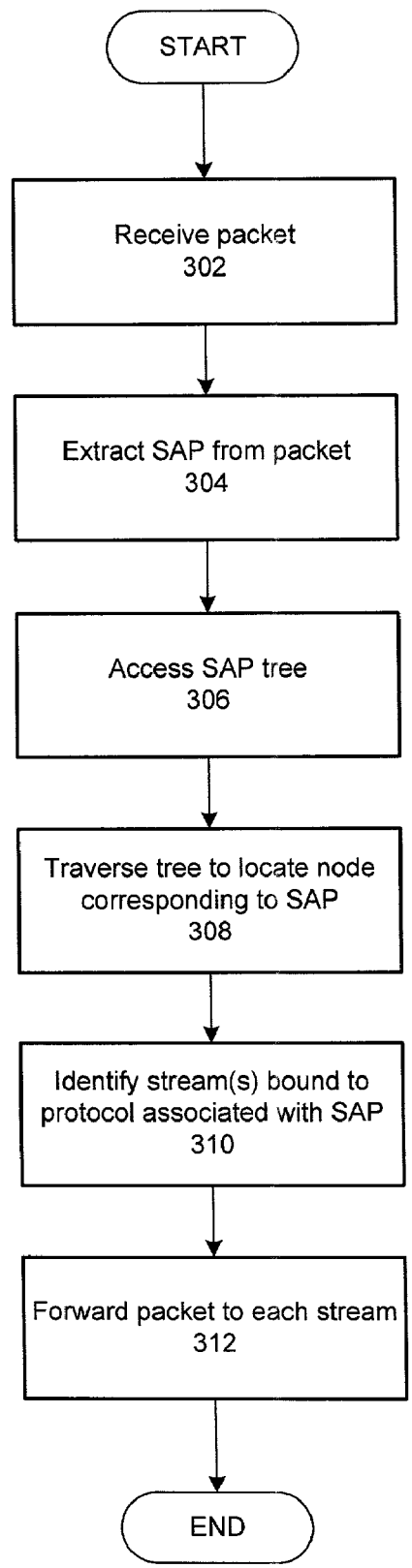
FIG. 3 is a flowchart illustrating one method of using a hierarchy of SAP nodes to identify a communication stream bound to a particular SAP, in accordance with an embodiment of the invention.

FIG. 3 illustrates a method of using a SAP tree (e.g., a tree of SAP nodes) to facilitate the steering of a packet to one or more communication streams, according to one embodiment of the invention.

In operation 302, a packet is received at a communication interface of a host computing device.

In operation 304, a SAP value is extracted from the packet. Illustratively, if the packet is determined to be configured according to a known layer two protocol (e.g., Ethernet), the SAP may be retrieved from a predetermined field, parameter or location of the packet.

In operation 306, the SAP tree for the communication interface is accessed (e.g., through the interface's soft state data structure). Illustratively, a root node or a reference to a root node of the tree may be stored in the soft state data structure.

In operation 308, the SAP tree is traversed to locate a node corresponding to the SAP extracted from the packet.

In operation 310, within the node, a list or reference identifying one or more communication streams associated with the SAP is examined. Also, a count of the number of such streams may be read. Illustratively, the node may contain a pointer to a list of communication streams or a list of references to the streams (or data structures corresponding to the streams).

In operation 312, the packet is forwarded to each stream identified in the node. In this embodiment, if the stream count is equal to one, the packet may simply be passed up to the next protocol or the stream consumer. If the stream count is greater than one, then for each referenced stream, the packet may be duplicated and the duplicate passed up. After all streams have been fed the packet, the original packet is freed.

As one skilled in the art will appreciate, rapidly locating a SAP node and learning that only one communication stream needs the packet can help avoid making unnecessary copies of the packet. In particular, in this embodiment of the invention, the reference count in the dblk containing the received packet remains at one, reflecting just the original mblk that references the dblk, because it is known that the packet does not need to be duplicated (i.e., for another stream). Keeping the reference count at one prevents an upper layer protocol (e.g., IP, IPV6) from unnecessarily copying the packet when it is passed up.

After operation 312, the illustrated method ends.

In one embodiment of the invention, each time a communication stream is opened or created, a per-stream data structure is instantiated. The per-stream data structure may be added to a list of such structures for all open streams of a single communication interface, of all interfaces, of all interfaces of one type, of all interfaces managed by a single device driver, etc. In one implementation of this embodiment, a per-stream data structure may be configured similar to the following:

```
typedef struct_str_t {
    struct_str_t *sb_nextp;
    struct_str_t *sb_sap_nextp;
    struct_str_specific_t stream_specific;
} str_t, *p_str_t;
```

In this sample implementation, the *sb_nextp pointer references the next per-stream data structure in the list of per-stream structures. The *sb_sap_nextp pointer references the next data structure corresponding to a stream associated with the same SAP. The stream_specific structure may contain stream-specific information.

Thus, in this embodiment of the invention, the hierarchy of SAP nodes identifies the communication streams associated with a particular SAP by referencing a first per-stream data structure corresponding to a first communication stream bound to a protocol associated with the SAP. By following the *sb_sap_nextp pointers, any other streams bound to the same protocol can be quickly and easily identified.

In an embodiment of the invention, the configuration of a SAP node (in the hierarchy of nodes) may be similar to the following:

```
typedef struct_sap_node_t {
    struct_sap_node_t *left;      /* pointer to left tree node */
    struct_sap_node_t *right;     /* pointer to right tree node */
    t_uscalar_t sap;              /* SAP identifier or value */
    p_str_t str_list;             /* list of streams with this SAP */
    uint_t str_cnt;               /* count of streams with this SAP */
} sap_node_t, *p_sap_node_t;
```

In this embodiment of the invention, a node is added to the hierarchy each time a communication stream is bound to a protocol identified by a SAP not already included in the hierarchy. The function to add a node may first ensure that no other node exists for the SAP. If the hierarchy does not yet exist, the function will begin it. The add function may or may not balance or optimize the hierarchy.

Similarly, a node may be removed from the hierarchy when a communication stream is unbound from a protocol (and closed) and the stream is the last one associated with a particular SAP. If the removed node was the only node in the tree, the tree may be deleted. The removal function may also be configured to balance or optimize the hierarchy.

As described above, when a communication is received at a communication interface in an embodiment of the invention, a SAP identifier, field, parameter or value is extracted. Illustratively, the device driver for the communication interface is configured to recognize a layer two protocol of the communication and retrieve the SAP identifier from a predetermined location within the communication. The SAP may comprise a protocol identifier or some other value that can be used to determine an appropriate service to provide or to identify an upper level protocol to handle the communication.

When the communication is received and the SAP field extracted, that field is used as a key for searching the SAP node hierarchy. If the hierarchy does not contain a node for the SAP, it may be assumed that there is no consumer (e.g., communication stream, application) for the communication and the device driver may therefore free it.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of steering a packet to a communication stream, comprising:
   receiving a first packet at a communication interface;
   extracting a first SAP (Service Access Point) value from the first packet;
   within a soft state data structure for the communication interface, accessing a hierarchical arrangement of nodes representing SAPs;
   searching the hierarchical arrangement for a first node representing the first SAP;
   retrieving from the first node a count of the number of communication streams associated with the first SAP; and
   forwarding the first packet to one or more communication streams identified in the first node.

2. The method of claim 1, further comprising prior to said receiving:
   associating a first communication stream with the first SAP;
   adding the first node to the hierarchical arrangement; and
   inserting a reference to the first communication stream into the first node.

3. The method of claim 1, further comprising:
   retrieving from the first node a list comprising the one or more communication streams.

4. The method of claim 1, wherein said extracting comprises:
   reading a predetermined field of the first packet.

5. A computer readable storage medium storing instructions that, when executed by a computer, cause the computer to perform a method of steering a packet to a communication stream, the method comprising:
   receiving a first packet at a communication interface;
   extracting a first SAP (Service Access Point) value from the first packet;
   within a soft state data structure for the communication interface, accessing a hierarchical arrangement of nodes representing SAPs;
   searching the hierarchical arrangement for a first node representing the first SAP;
   retrieving from the first node a count of the number of communication streams associated with the first SAP; and
   forwarding the first packet to one or more communication streams identified in the first node.

6. A method of facilitating the use of a hierarchical representation of SAPs (Service Access Points) to steer received packets to communication streams associated with the SAPs, the method comprising:
   attaching a first communication stream to a communication interface;
   associating the first communication stream with a first SAP value;
   within a hierarchy of SAP nodes, wherein each SAP node corresponds to a SAP, configuring a first SAP node in the set of nodes to include:
      the first SAP value; and
      a reference to the first communication stream;
   receiving a first packet containing the first SAP value;
   traversing the hierarchy of SAP nodes to locate the first SAP node; and
   forwarding the first packet to one or more communication streams identified in the first SAP node.

7. The method of claim 6, further comprising:
   creating a reference to the hierarchy of SAP nodes within a soft state data structure configured to store status information regarding the communication interface.

8. The method of claim 6, wherein said associating comprises:
   binding the first communication stream to a first communication protocol associated with the first SAP value.

9. The method of claim 6, wherein said configuring further comprises:
   configuring the first SAP node to include a count of the number of communication streams associated with the first SAP value.

10. The method of claim 6, further comprising:
    associating a second communication stream with the first SAP value; and
    modifying the first SAP node to include a reference to the second communication stream.

11. The method of claim 10, wherein:
    said reference to the first communication stream comprises a list of communication streams; and
    said modifying comprises adding the second communication stream to the list.

12. The method of claim 10, wherein said modifying comprises:
    increasing a count of the number of communication streams associated with the first SAP value.

13. A computer readable storage medium storing instructions that, when executed by a computer, cause the computer to perform a method of facilitating the use of a hierarchical representation of SAPs (Service Access Points) to steer received packets to communication streams bound to the SAPs, the method comprising:
    attaching a first communication stream to a communication interface;
    associating the first communication stream with a first SAP value;
    within a hierarchy of SAP nodes, wherein each SAP node corresponds to a SAP, configuring a first SAP node in the set of nodes to include:
       the first SAP value; and
       a reference to the first communication stream;
    receiving a first packet containing the first SAP value;
    traversing the hierarchy of SAP nodes to locate the first SAP node; and
    forwarding the first packet to one or more communication streams identified in the first SAP node.

14. A computer readable storage medium containing a data structure comprising a hierarchical index of nodes representing SAPs (Service Access Points) associated with communication streams, the data structure comprising:
    a set of nodes, each node comprising:
       a SAP value;
       a count of the number of communication streams bound to a protocol corresponding to said SAP value;
       a reference to the communication streams bound to the protocol corresponding to said SAP value;
       a first pointer configured to reference a first node having a lower SAP value than said SAP value; and
       a second pointer configured to reference a second node having a higher SAP value than said SAP value.

15. An apparatus for steering a packet to an open communication stream, comprising:
    a communication interface configured to receive a first packet for a host computing device;
    a memory configured to store a hierarchy of SAP (Service Access Point) nodes, wherein each said SAP node identifies only those communication streams traversing the communication interface that are associated with said SAP; and a device driver configured to:

manage the communication streams on behalf of one or more applications; and remove a first SAP node from said hierarchy when a communication stream is closed if the communication stream is the only communication stream through the communication interface that is associated with said first SAP.

16. The apparatus of claim 15, wherein each said SAP node comprises:

said SAP;

a reference to a first communication stream associated with said SAP; and a count of the number of communication streams associated with said SAP.

17. The apparatus of claim 15, wherein a first SAP is stored as a type/length field in the first packet, wherein the first packet belongs to a first communication stream associated with the first SAP.

18. The apparatus of claim 15, wherein said hierarchy of SAP nodes comprises a binary tree.

19. The apparatus of claim 15, wherein said device driver is further configured to add a new SAP node to said hierarchy when a communication stream is associated with a SAP not already included in said hierarchy.

20. The apparatus of claim 15, wherein said device driver is further configured to:

retrieve a first SAP from the first packet;

search said hierarchy for a first SAP node corresponding to the first SAP; and forward the first packet to one or more communication streams identified by the first SAP node.

* * * * *